April 8, 1924. 1,489,751
L. V. FRALEY
CONVEYER APRON
Filed April 18, 1919 5 Sheets-Sheet 4
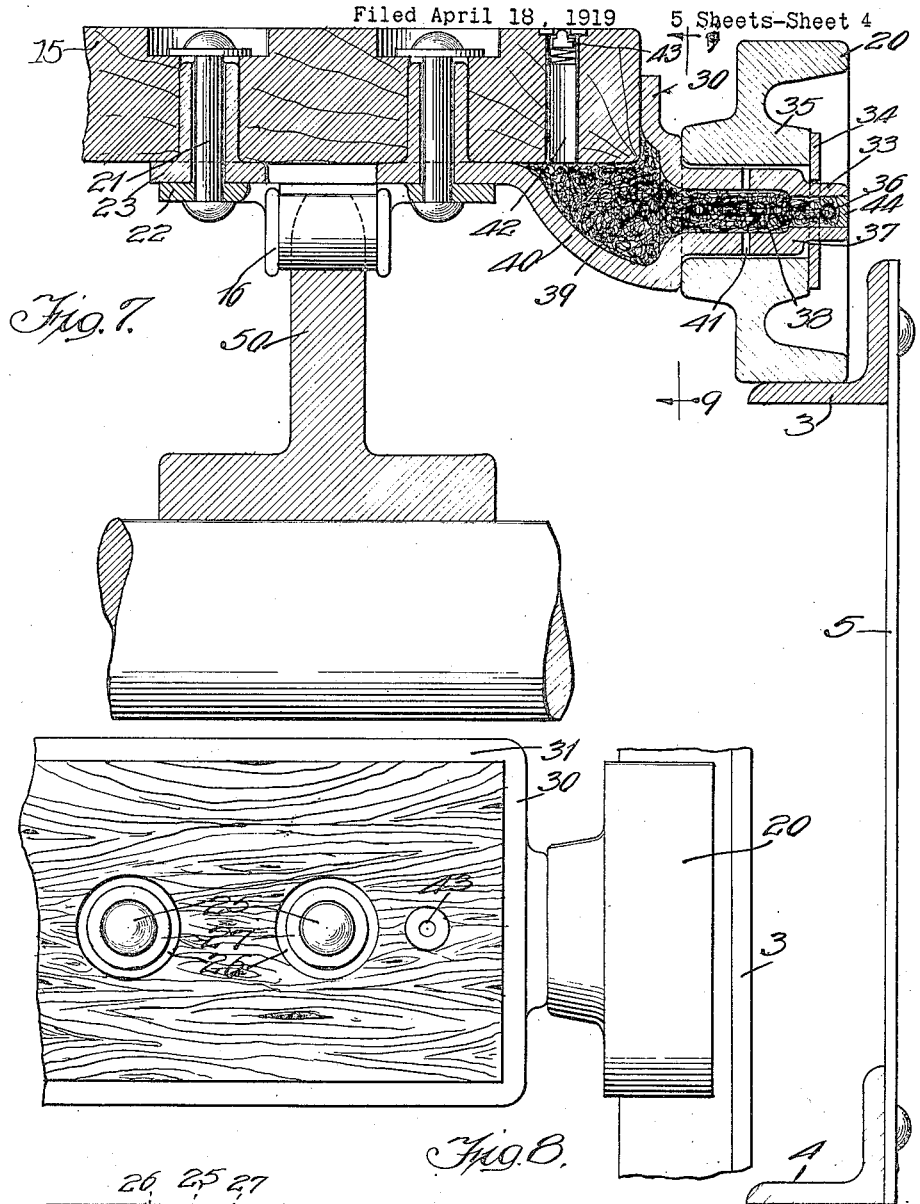

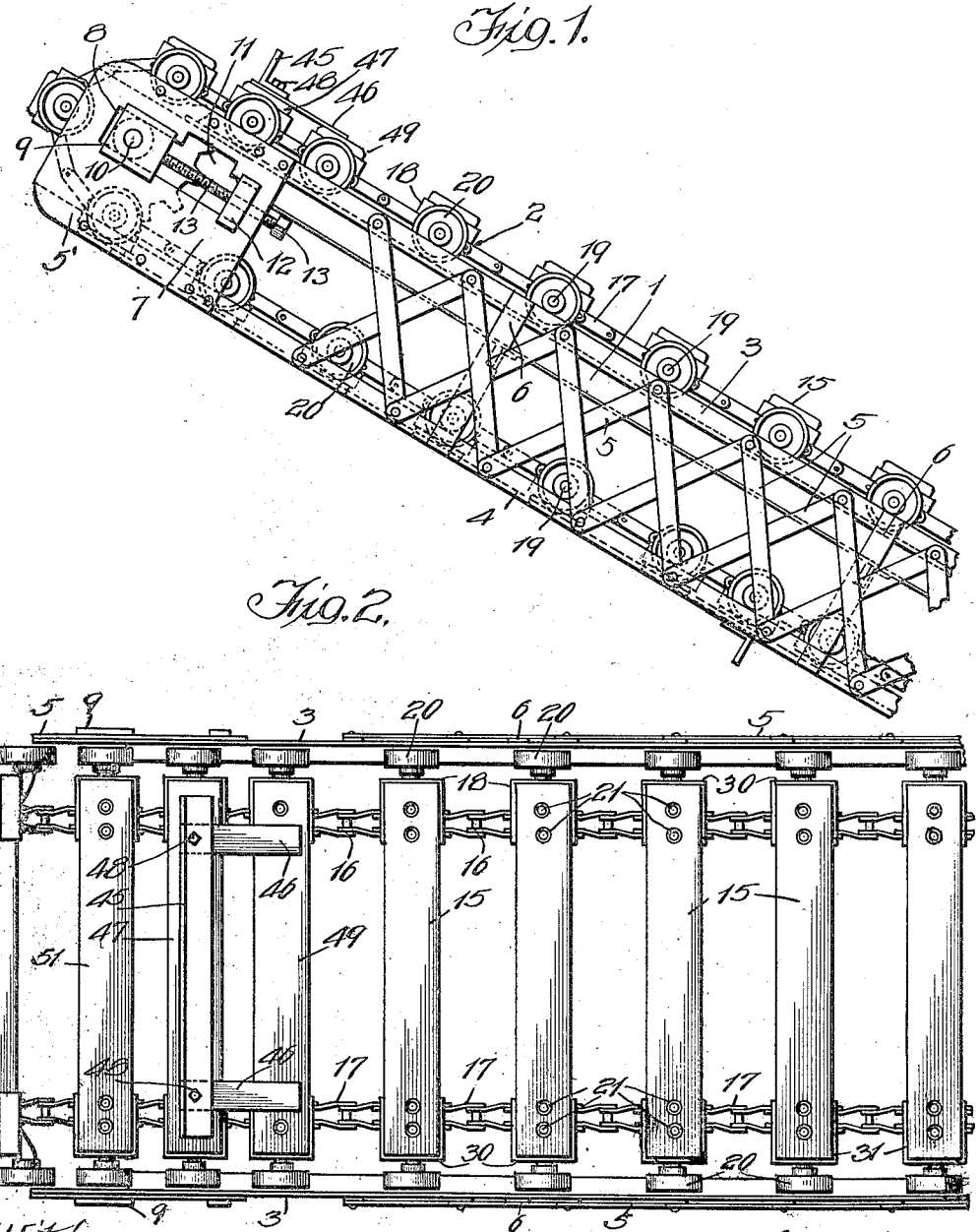

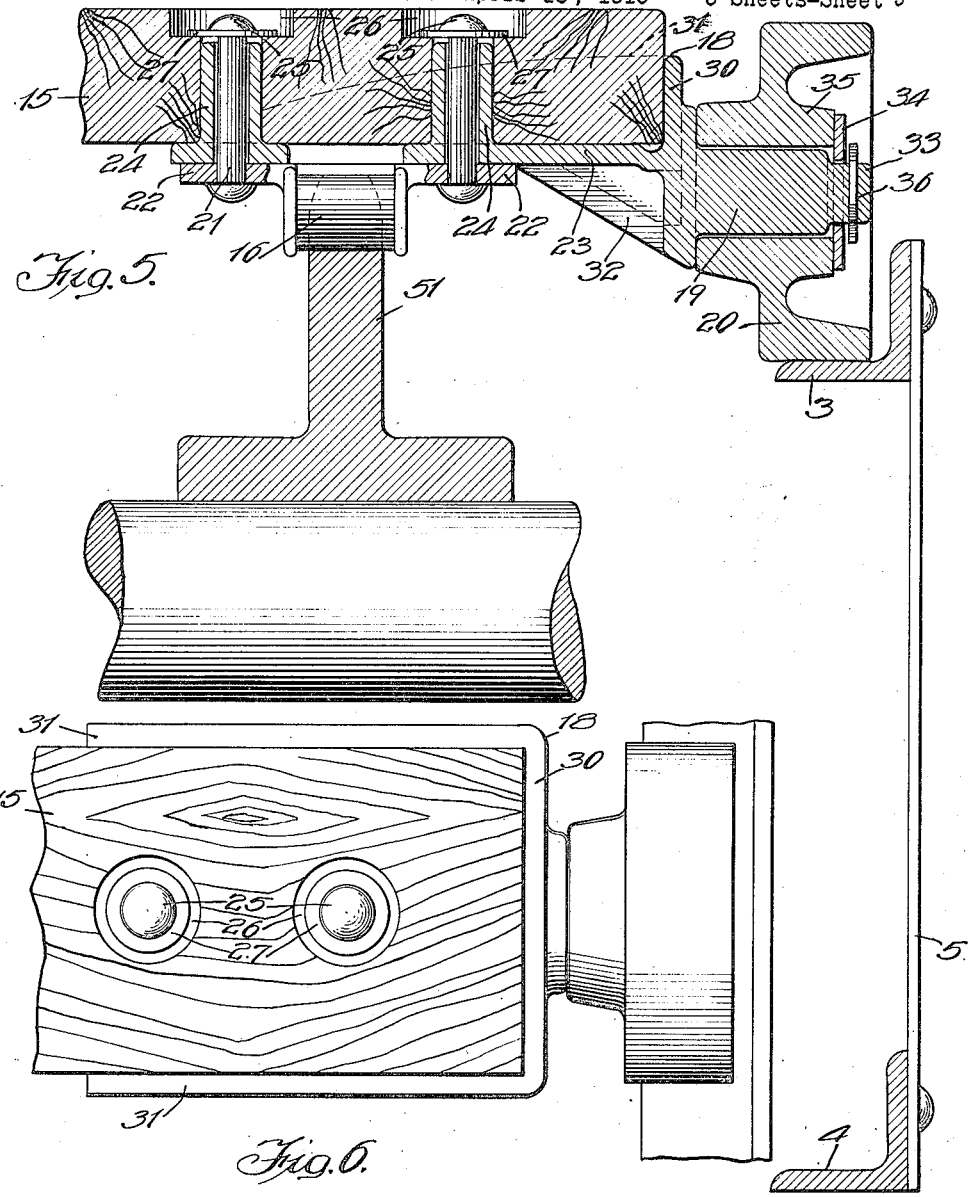

April 8, 1924.　　　　　　　　　　　　　　　　1,489,751
L. V. FRALEY
CONVEYER APRON
Filed April 18, 1919　　5 Sheets-Sheet 5
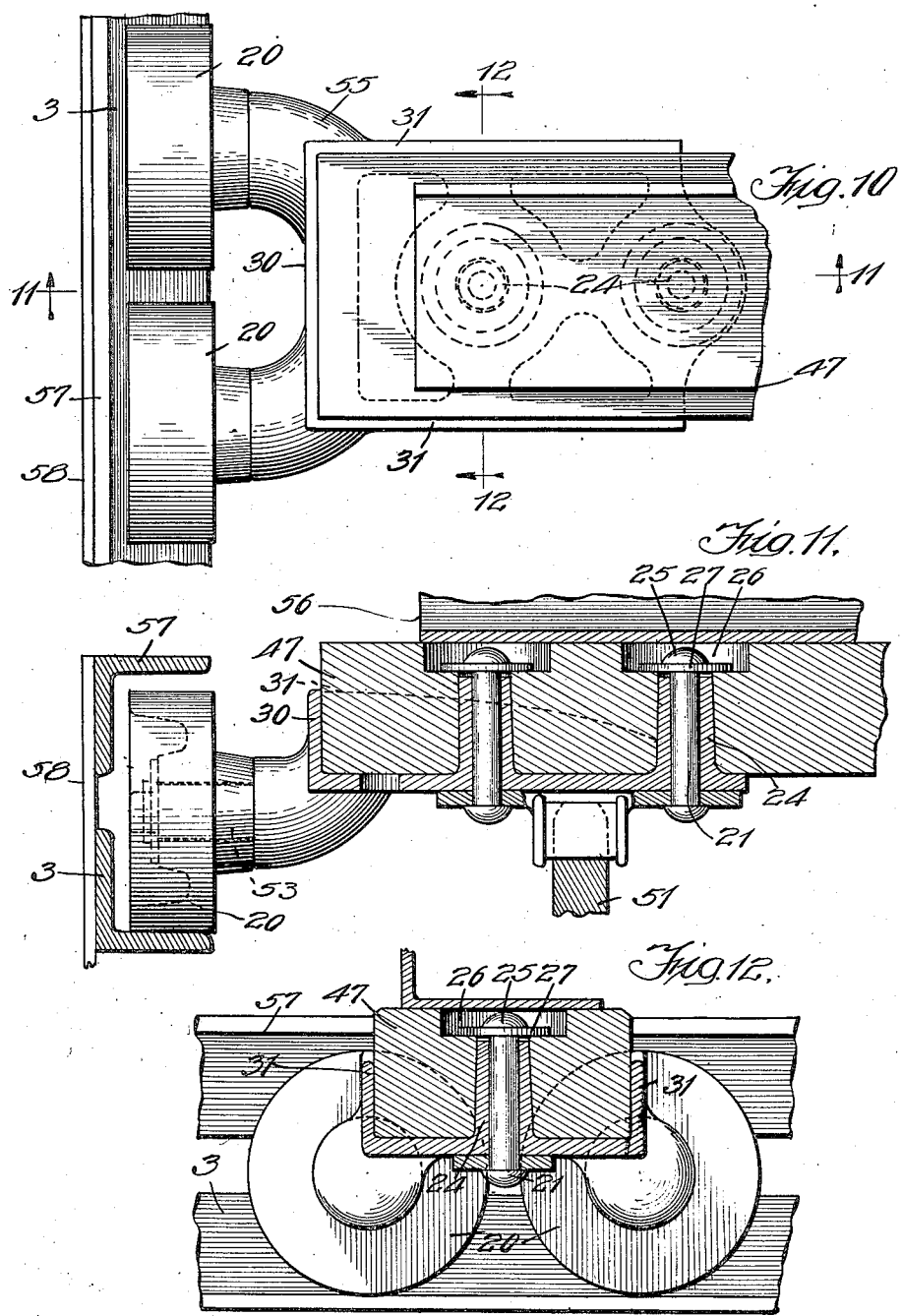

Patented Apr. 8, 1924.

1,489,751

UNITED STATES PATENT OFFICE.

LAWRENCE V. FRALEY, OF CHICAGO, ILLINOIS, ASSIGNOR, BY MESNE ASSIGNMENTS, TO STANDARD CONVEYOR COMPANY, OF NORTH ST. PAUL, MINNESOTA, A CORPORATION OF MINNESOTA.

CONVEYER APRON.

Application filed April 18, 1919. Serial No. 290,962.

*To all whom it may concern:*

Be it known that I, LAWRENCE V. FRALEY, a citizen of the United States, residing at Chicago, in the county of Cook and State of Illinois, have invented a certain new and useful Improvement in Conveyer Aprons, of which the following is a full, clear, concise, and exact description reference being had to the accompanying drawings, forming a part of this specification.

My invention relates to conveyers and more particularly to apron or slat type carriages for the same.

In conveying machinery the traveling surface or apron which supports the commodities to be carried or conveyed is subjected to severe conditions. It is important that the friction of the apron should be reduced to as small an amount as possible, both for more efficient operation of the device and also for lessening the strain in the carriage. It is also desirable that the apron be made as light as possible for the same reasons.

I form the apron of a series of wooden slats, preferably of maple wood, connected by chains which run over sprocket wheels at the ends of the conveyer arm or carrier. Heretofore the apron has consisted of a number of steel axles with rollers at the ends of the axles bearing upon the side angles of the carrier, these axles being connected by chains. Upon these chains the conveyer slats have been secured, the slats being supported solely on the chains.

According to my invention I dispense with the axles and provide rollers on the ends of the apron slats and cause these rollers to bear upon the flanges of the angle bars forming the sides of the conveyer arm or carrier. Thus the apron slats are individually supported upon the conveyer arm or carrier and hence run evenly and smoothly with a minimum strain upon the conveying chains.

I have also provided means for preventing tilting or twisting of the apron slats, particularly those slats which carry cleats for holding the boxes, bags, etc. upon the apron. In one embodiment of this feature of my invention the apron slat which carries the cleat is braced against an adjacent slat so that a brace of considerable length for resisting the twisting effort is provided. In another embodiment the slat has a pair of rollers which provide a supporting base for resisting any tendency for the slat to twist or turn.

The rollers are secured upon the ends of the slats by malleable gudgeons or saddle pieces having projecting axle portions so that each slat has an individual support. Preferably the gudgeons or saddle pieces are raised above the axles to such an extend as to bring the chains which are fastened to the lower surface of the gudgeons substantially in line with the axles. This causes the chain to pull centrally upon the rollers so that even under load the apron is moved easily and there is no tendency to tilt the apron slats.

In order to acquaint those skilled in the art with the manner of constructing and practicing my invention I shall now describe a specific embodiment of the same in connection with the accompanying drawings which form a part of the present invention.

Figure 1 is a side elevational view of a conveyer apron and carrier embodying my invention;

Figure 2 is a plan view of a portion of the apron shown in Figure 1;

Figure 5 is a fragmentary sectional view thru the gudgeon and slats of the conveyer apron showing also the angle bar and the sprocket in cross section;

Figure 6 is a plan view of the details shown in Figure 5;

Figure 7 is a fragmentary sectional view similar to the view of Figure 5 of a modification;

Figure 8 is a plan view of the same;

Figure 9 is a section taken on the line 9—9 of Figure 7;

Figure 10 is a fragmentary plan view of a modification showing the use of a double roller for carrying a slat having a cleat;

Figure 11 is a cross sectional view taken on the line 11—11 of Figure 10; and

Figure 12 is a cross sectional view taken on the line 12—12 of Figure 10.

Figure 3:
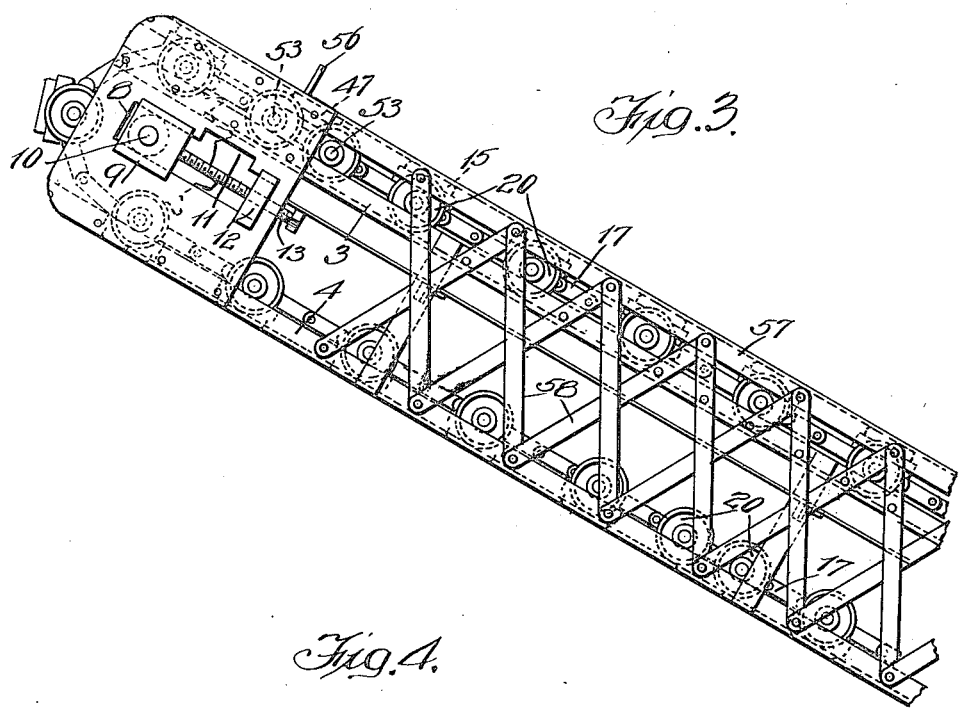
Figure 3 is a side elevational view of a modified form.

I have shown in Figures 1 and 2 the head of a conveyer arm 1 having thereupon the traveling surface or apron 2 for conveying the objects or commodities for which this type of carrier is designed. The conveyer arm 1 consists preferably of the upper guiding angle 3 and the lower guiding angle 4, which angles are connected by the diagonal slats or lattice work 5 and vertical struts or braces 6. At their outer ends the angle bars 3 and 4 are connected by a plate 5′ which is riveted to the vertical sides of the angle bars. This plate is cut out as shown at 8 to form a guide for the movable bearing box 9. This bearing box provides a suitable journal for the shaft 10, which shaft carries a sprocket wheel for each of the chains of the carrier or apron 2.

The threaded rod 13 bears against the bearing box 9 and serves to hold it in adjusted position. The tendency of the weight of the apron is to pull the box downwardly and inwardly hence there is no tendency for the box 9 to drop into the edge of the notch 11. The box 9 and the block both have grooves cut in their upper and lower faces so that they may be guided upon the edges of the plate 5.

The plate has a special notched or cut away portion 11 for introducing the sliding box 9 and for introducing the nut or threaded block 12 thru which is threaded the bolt or threaded rod 13. The block 12 serves as an abutment for the sliding box 9 as it limits the inward movement of the box in the opening 8 through the means of the threaded rod 13.

The carrier or apron 2 comprises a series of slats 15 which are connected by two continuous chains 16 and 17 running over suitable sprockets at the ends of the conveyer arm. In the present case, it is very desirable to make the slats out of wood in order to secure lightness, but this is not essential to the invention as other suitable material will serve the purpose. The slats 15 have malleable or cast iron gudgeons 18 at their ends and these gudgeons are provided with axles 19 for the rollers 20. Rivets 21 pass thru the slats 15, the gudgeons 18 and the wings 22 which are formed on suitable links of the chains 16 and 17.

As shown in Figures 5 and 6 in detail, the gudgeons 18 are preferably formed of malleable castings having the bottom wall 23 from which extend hollow studs 24, these studs passing up thru suitable holes which are bored near the ends of the slats 15. The hollow studs are slightly tapered both for the purpose of clearance of the pattern in casting and also for the purpose of securing a tight fit of the studs in the holes of the slats 15. This secures a wedge engagement and permits the slats to be drawn down tightly into the saddle portion of the gudgeon. The hollow bosses or studs 24 extend upward to a distance short of the thickness of the slats to permit the heads 25 of the rivets 21 to be set in a short counter bore at 26. Suitable washers 27 lie betwen the bottom of the counter bore 26 and the head 25 of the rivets. The hollow stud 24 comes just short of the washer 27 so that the rivet may be tightly drawn up.

The walls 23, 30 and 31 of the gudgeon form a saddle or socket portion for embracing the ends of the slats. The end faces of the slats are brought against the wall 30 to prevent twisting of the slats, and consequently, the tendency for the slats to split at their ends due to the presence of fastening bolts 21 is overcome.

The gudgeon 18 has the end walls 30 and side walls 31 for holding the gudgeon accurately in position on the end of the slats 15. The axle portion 19 is secured to the wall 30 and the bottom of the gudgeon by means of a fin or brace 32. The outer end of the axle 19 is reduced in size as shown at 33 and a washer 34 passes over the reduced portion and forms an end bearing for the hub 35 of the roller 20. A cotter pin 36 passes thru a suitable hole in the reduced end portion 33 of the axle.

In Figures 7, 8 and 9 I have illustrated a modification in which the axle of the gudgeon is made hollow to provide a lubricating channel.

The axle 37 is provided with a hollow cavity 38 which cavity communicates with a pocket 39 formed in the bottom wall of the gudgeon by a suitable enlargement 40. This pocket or well 39 and the bore of the axle are filled with absorbent material to hold a lubricant which lubricant is adapted to lubricate the axle 37 in its bearing in the roller 20 by means of the lubricating passage 41. A suitable filling opening 42 is formed thru the slats in line with the well or pocket 39. The outer end of this passage is closed by a spring button or cover 43 which may be depressed by the spout of an oil can when it is desired to introduce lubricant into the well 39. The outer end of the bore of the axle is closed by a plug 44 to prevent the escape of lubricant therefrom.

In the forms shown the surface of the slat 15 is raised slightly above the edge of the rollers 20 so that a commodity being borne on the slat 15 will not rub against the rollers even though it overhang the ends of the slats.

At given intervals on the traveling surface or apron, I provide cleats which will aid to hold the commodities being conveyed against backward slippage on the apron. As shown in Figures 1 and 2 the cleat comprises a bar of angle iron 45 which is placed with one wing thereof parallel to the face of the slats and the other vertical thereto. Small pieces of flat bar iron 46 are placed between the horizontal wing of the angle iron 45 and the top of the particular slat 47 and extend to the rear over the adjacent slat 49. Suitable bolts 48 pass thru the lower wing of the angle bar 45 and thru the bars 46 to hold the bars and the angle iron firmly in fixed relation to the particular slat 47. The rears ends of the bars 46 are not fastened to the slat 49, but merely rest upon the same so that in passing around the sprockets 50 at the ends of the arm sufficient lost motion is permitted to prevent the slats 47 and 48 from being bound or cramped. It will be noticed that the slats 47, 49 and 51 are placed closer to each other than are the slats 15, which slats 15 occupy the space on the apron between the portions which bear the brackets 45. It can be seen that the resistance of a commodity bearing against the vertical leg of the angle bar 45 tends to turn the slat 47 about the axle 19. In this form of the device the bars 46 resting upon the slats 49 take up this tendency to turn and hold the slat in proper position.

Figure 4:
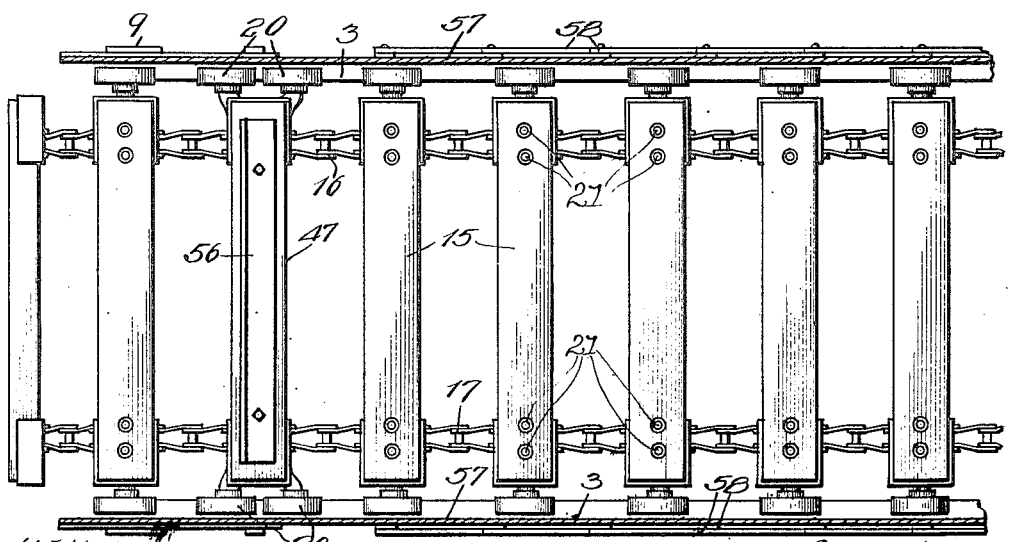
Figure 4 is a plan view of the form shown in Figure 3.

In Figures 3, 4, 10, 11 and 12 I have illustrated a form of carrier and gudgeon which obviates the necessity for the use of the bars 46 for preventing or resisting the turning of the slat 47. In this form of the device the slat 47 has two axles 53 extending from the corners of the saddle portion. The construction of the gudgeon having the double axles 53 is substantially the same as that shown in Figures 5 and 6 in other respects.

In order to prevent tilting of the slat 47 which bears the angle bar 56 upon the upper face thereof, I provide a channel having a wall both at the bottom and at the top. This channel is formed of the two angle irons 3 and 57 which are connected together by the diagonal bars 58 which connect the two angle bars 3 and 57 and the lower angle bar 4. Thus the tendency of a commodity bearing against the angle bar 56 to twist the slat 47 about its axis is resisted by the two rollers 20 running between the angle bars 3 and 57.

The saddle or socket portion of the gudgeon embraces the sides of the seat at the end to prevent possible motion between the gudgeon and the slat and also to prevent splitting of the end of the slat by the studs 24. The corners of the saddle or socket portion may be relieved to insure that the slat will fit with the bottom without binding at the corners.

It will be noted that the chain lies substantially in line with the center of the axle 19 so that tilting of the slat if it does occur tends to place the least strain upon the chain and the friction of the rollers will not tend to tighten the chain and cause it to wear rapidly.

From the above it will be apparent that I have provided a light and strong apron of simple and inexpensive construction and one in which the minimum stress and wear on the conveyer chains occurs.

I do not intend to be limited to the precise details shown and described.

I claim:

1. In combination, a wooden slat adapted to have rollers at the ends thereof, axle portions for the rollers, a saddle portion carried by said axle portions, the end face of said slat being engaged by the saddle portion to prevent twisting of the slat, means for securing the slat upon said saddle portion, said means lying at a substantial distance from said end face engagement whereby the tendency of splitting at the ends of the slats is prevented, and a chain secured to said saddle portion substantially at said securing means.

2. In combination, a wooden slat, a gudgeon having a saddle portion and a projecting axle portion, a chain having a link with projecting wing portions, said saddle portion having hollow studs projecting in wedge engagement into the bottom of the slat adjacent the end thereof, said saddle portion embracing the end of the slat, rollers mounted on the axle portion and rivets passing thru the wings of the chain links and thru the hollow studs to hold the slats, the saddle portion and the chain links together, said studs serving as means for preventing wearing of the slats by said rivets and to increase the rigidity of the slat in the saddle portion of said gudgeon.

3. In combination, a slat, a gudgeon having a saddle portion embracing the end of the slat and an axle portion projecting from said saddle portion, a roller on said axle portion, a chain having a link thereof connected to the gudgeon, and a cleat mounted on the top surface of the slat, means extending from said cleat to the adjacent slat, said means preventing turning of the cleat and the slat carrying the same when a load is placed thereon.

4. In combination, a slat, a gudgeon for carrying a roller having an axle portion, a saddle portion embracing the end of the slat, projections extending from the bottom of the saddle portion into the slat in wedge engagement, and fastening means passing thru said projecting portion for holding the slat and the saddle member together, said projections serving as means to reinforce and prevent wearing of the slat and to increase the rigidity thereof in the saddle portion of said gudgeon.

5. In combination with end frame members, a slat, a saddle embracing the end of the slat and terminating in an axle portion on which a roller is carried, a chamber provided in the saddle having an opening through which lubricant may be introduced, the axle portion having ports for feeding the lubricant to the rollers, said slat being embraced by the saddle in such a manner as to close off said chamber.

6. In a conveyer, an arm having a channel with upper and lower walls, an apron slat, a gudgeon having a saddle portion for the end of the slat, said gudgeon having a pair of axles extending therefrom, rollers mounted on said axles and running in said channel between the upper and lower walls thereof, and a cleat mounted on the apron slat.

7. In a conveyer, a conveyer arm having tracks along the sides of the same, a series of apron slats having gudgeons secured upon the ends of the same and rollers on the gudgeons, said rollers running on said tracks at each side of the arm, a cleat mounted on one of said slats having means for preventing turning of the said slat upon which the cleat is mounted.

8. In combination, a slat, a gudgeon having a saddle portion embracing the end of the slat and an axle portion, a roller on the axle, a chain lying against the bottom of the saddle portion, and means for securing the chain the gudgeon and the slat together, said means preventing wearing of said slat at the points of engagement and increasing the rigidity of the slat in the saddle portion of said gudgeon.

9. In combination, a slat, a gudgeon having a saddle portion and an axle portion, a roller on the axle and a chain secured to the slat, said chain lying on the line of the axis of the axle, and a cleat mounted on the top of the slat, said cleat provided with bars adapted to bear upon the face of the adjacent slat, said bars preventing the turning of said cleat and the slat carrying the same.

10. In combination, a conveyer arm, an apron carrier on said arm, said carrier comprising a series of slats each having rollers at their respective ends, said slats being connected together by chains, said arm having an upper and a lower track for guiding and supporting the rollers, said upper track comprising a pair of angle bars facing each other and having their outer legs lying in line with each other, the lower track comprising an angle bar facing upwardly and having its outer leg lying substantially in line with the outer legs of said upper bars, means connecting said outer legs together, cleats on certain ones of the slats and means cooperating with said upper track for preventing the tilting of said cleated slats.

In witness whereof I hereunto subscribe my name this 14th day of April, A. D. 1919.

LAWRENCE V. FRALEY.